US009443200B2

(12) United States Patent
Schroff

(10) Patent No.: US 9,443,200 B2
(45) Date of Patent: Sep. 13, 2016

(54) METHOD FOR INTERACTION-FREE ENTANGLEMENT OF QUANTUM BITS IN QUANTUM COMPUTERS

(71) Applicant: Gerhart Schroff, Backnang (DE)

(72) Inventor: Gerhart Schroff, Backnang (DE)

( * ) Notice: Subject to any disclaimer, the term of this patent is extended or adjusted under 35 U.S.C. 154(b) by 31 days.

(21) Appl. No.: 14/625,929

(22) Filed: Feb. 19, 2015

(65) Prior Publication Data

US 2015/0332163 A1 Nov. 19, 2015

(30) Foreign Application Priority Data

May 16, 2014 (DE) ........................ 10 2014 007 248

(51) Int. Cl.
*G06N 99/00* (2010.01)

(52) U.S. Cl.
CPC .................................. *G06N 99/002* (2013.01)

(58) Field of Classification Search
CPC ...... G06N 7/00; G06N 99/00; G06N 99/002; H01L 39/00; H01L 39/16; H01L 39/18–39/228; G01R 33/20; G01R 33/1284
See application file for complete search history.

(56) References Cited

U.S. PATENT DOCUMENTS 8,654,578 B2 * 2/2014 Lewis ..................... G11C 11/44 257/30
2005/0082519 A1 * 4/2005 Amin ..................... B82Y 10/00 257/13
2008/0237579 A1 * 10/2008 Barker .................. B82Y 10/00 257/30
2013/0308956 A1 * 11/2013 Meyers .................. H04B 10/11 398/130

FOREIGN PATENT DOCUMENTS

DE 102012000044 A1 * 12/2012 ........... G06N 99/002

* cited by examiner

*Primary Examiner* — David E Smith
(74) *Attorney, Agent, or Firm* — Patent Central LLC; Stephan A. Pendorf

(57) ABSTRACT

A method for interaction-free entanglement of quantum bits in quantum computers, in which the quantum bits to be entangled are available in the state $\Psi_{44}$ with arbitrarily real phases $\phi$ and $\theta$ as an elementary quantum system. The two quantum bits (1) and (2) are localized in spatial regions (6) and (6') and surrounded by switchable sheaths (7) and (7') preferably a superconductor with the jump temperature $T_{SU}$. The switchable sheaths, in the activated state, completely displace a global, homogeneous magnetic field $B_z$ from the spatial regions (6) and (6'). In the inactivated state, the switchable sheaths do not shield the spatial regions (6) and (6'). If the switchable sheaths are switched from the activated state into the inactivated state while observing the boundary condition (R3), as a result of this, the two quantum bits (1) and (2) are transferred into the entangled state $\Psi_{-}$.

12 Claims, 2 Drawing Sheets

METHOD FOR INTERACTION-FREE ENTANGLEMENT OF QUANTUM BITS IN QUANTUM COMPUTERS

BACKGROUND OF THE INVENTION

1. Field of the Invention

The invention relates to a method for interaction-free entanglement of quantum bits in quantum computers.

2. Description of the Related Art

Various methods are known for entangling quantum bits in quantum computers. By way of example, the quantum systems to be entangled may be transferred into the desired entangled state by means of physical interactions. A corresponding method is described in [6]. There, the ions enclosed in a linear ion trap can be prepared in an entangled state in a defined manner due to the Coulomb repulsion occurring between the ions.

A method for interaction-free entanglement of quantum systems is described in [15]. However, the significant disadvantage of this method can be seen in the fact that a classical information channel is required in this method.

In the method proposed in [1], neither an interaction nor a classical information channel is required in order to be able to transfer two quantum bits (qubits) into an entangled state. In this method, the preparation step essential for the process of entanglement consists of it being necessary to sufficiently quickly superpose a homogeneous magnetic field B, over the quantum bits to be entangled. However, a significant disadvantage of the method for state entanglement, proposed in [1], can be seen in the fact that, to this end, the magnetic field B, needs to be switched on and, thereafter, also needs to be switched off again in a defined manner. In practice, this is very complicated and connected with high costs.

BRIEF SUMMARY OF THE INVENTION

Proceeding herefrom, the invention is based on the object of developing the method for entangling quantum bits in quantum computers, as described in [1], in such a way that the preparation step proposed for entangling quantum bits can be carried out in such a way that it can be realized in a simple and cost-effective manner.

The invention is based on the discovery that a homogeneous magnetic field 13, can also be superposed sufficiently quickly onto the quantum bits to be entangled by means of shielding that can be switched on and off.

In order to solve this object, the combination of features specified in claim 1 is proposed. Advantageous embodiments and developments of the invention emerge from the dependent claims.

BRIEF DESCRIPTION OF THE SEVERAL VIEWS OF THE DRAWINGS

In the following the invention will be described in greater detail by reference to the illustrative embodiments shown in schematic manner in the figures, wherein.

DETAILED DESCRIPTION OF THE INVENTION

Figure 1:
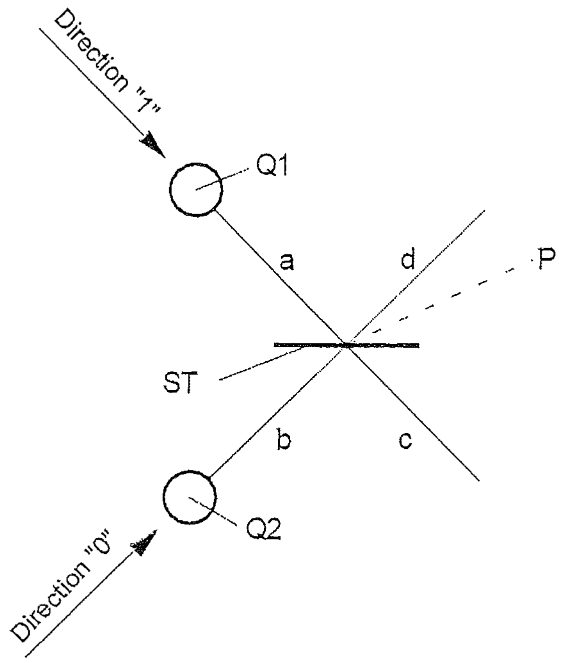
FIG. 1 schematically depicts an example of a physically realizable, nonlocal, unitary operators which describe a state transformation and which cannot be considered to be interaction operators.

In order to better understand the method for interaction-free entanglement of quantum bits in quantum computers, as proposed in [1], it is helpful to briefly discuss a few very basic concepts. To this end, the terms and references used in [1] are adopted and, like in [1], only pure states are considered.

Entangled quantum systems may occur due to the superposition principle, which is postulated within the framework of quantum physics and verified by a large number of experiments. The superposition principle is understood to mean the following (in this respect, see e.g. [2] and [3]): if there are a number of different options when preparing a state such that it is not possible, as a matter of principle, to decide which option was realized, the state resulting from the preparation process emerges from the sum (in the case of a countable number) of the individual options, weighted by the respective probability amplitude.

Furthermore, quantum physics demands of a closed quantum system that the time development (the stated dynamics) must be describable by means of unitary operators. Naturally, this also applies for the state dynamics which can be assigned to a preparation process, as long as the latter preserves the norm. Therefore, preparation processes which preserve the norm need to be describable by means of unitary operators. Operators which can be considered as describing a specific physical process are referred to as "physically realizable" operators in the following text.

Independent quantum systems can always be described by product states within the scope of quantum physics. If two independent quantum systems A and B with the system Hilbert spaces $H_A$ and $H_B$ are considered, the overall system is described in the Hilbert space $H_{BA}=H_B \times H_A$, which is formed by the tensor product of the system spaces. An operator $E_A$, which only acts on $H_A$, is then assigned to the operator $1 \times E_A$ (1 is the identity operator in this case) in $H_{BA}$. An operator $E_B$ localized on $H_B$ is then assigned to the operator $E_B \times 1$ in $H_{BA}$. As long as the systems can be considered to be independent, any state transformation can be described by an operator in the form $E_B \times E_A$, i.e. as a tensor product of two operators locally acting on the respective system Hilbert spaces. Therefore, interactions between the systems are described by operators $W_{BA}$ on $H_{BA}$, which operators cannot be decomposed into a tensor product of two locally acting operators. Therefore, interaction operators $W_{BA}$ are always nonlocal operators.

However, it is not possible to deduce from this that each physically realizable, nonlocal, unitary operator describing a state transfollnation describes an interaction and therefore needs to be considered as an interaction operator. By means of an example, it can easily be shown that there are also physically realizable, nonlocal, unitary operators which describe a state transformation and which cannot be considered to be interaction operators:

The considered arrangement is depicted schematically in FIG. 1.

Two sources Q1 and Q2 with an identical design should each emit a photon at freely selectable times. The source Q1 emits the photon 1 and the source Q2 emits the photon 2. The photon 1 should impinge on a symmetric, lossless beam splitter ST along the path a and the photon 2 should impinge on the beam splitter ST along the path b. Paths a and b should intersect on the beam splitter ST at the point P. Furthermore, the paths which the photons 1 and 2 need to traverse from the sources Q1 and Q2 to the point of impingement P on the beam splitter should have exactly the same length. Here, the source Q1 (Q2) is to be arranged in such a way that the photon 1 (photon 2) moves away from the beam splitter again along the path d (c) when it is reflected on the beam splitter and the photon 1 (photon 2) moves away from the beam splitter again along the path c (d) when it passes through the beam splitter (see FIG. 1).

The following notation is introduced for the further discussion: if a photon flies in the direction 1 (path a and c), the photon i (i=1, 2) is assigned to the state $|1>_i$. If the photon i flies in the direction 0 (path b and d), said photon is assigned the state $|0>_i$. Before the two independent, identical photons reach the beam splitter ST, these can then be assigned the state:

$$\Psi_1=|0>_2|1>_1=|0,1 \quad (1)$$

The state transformation brought about by the symmetric beam splitter can then be described by the unitary, local operator $U_{ST}$ for two distinguishable photons (by way of example, this can be achieved by virtue of the two identical photons impinging with such a time offset on the beam splitter ST that the wave trains (wave packets) assigned to the photons do not overlap on the beam splitter) [4], [5]:

$$U_{ST}=\frac{1}{\sqrt{4}}\begin{array}{c} \\ |0,0\rangle \\ |0,1\rangle \\ |1,0\rangle \\ |1,1\rangle \end{array}\begin{array}{cccc} \langle 0,0| & \langle 0,1| & \langle 1,0| & \langle 1,1| \\ \end{array}\begin{bmatrix} 1 & i & i & -1 \\ i & 1 & -1 & i \\ i & -1 & 1 & i \\ -1 & i & i & 1 \end{bmatrix} \quad (2)$$

where:

$$U_{ST}=\frac{1}{\sqrt{4}}\begin{bmatrix} 1 & i \\ i & 1 \end{bmatrix}\times\begin{bmatrix} 1 & i \\ i & 1 \end{bmatrix} \quad (3)$$

Then, the following is obtained for the state $\Psi_2$ leaving the beam splitter:

$$\Psi_2=U_{ST}\Psi_1 \quad (4)$$

$$\Psi_2=\tfrac{1}{4}^{1/2}(i|1>_2|1>_1+i|0>_2|0>_1+|0>_2|1>_1-|1>_2|0>_1). \quad (5)$$

Since the question as to when two physically completely identical quantum systems can be considered to be distinguishable gives rise time and time again to controversial discussions, it is expedient to briefly discuss the term “distinguishable, identical quantum systems” here:

The most common notion, which is also well established experimentally, in respect of the question of when it is possible to speak about distinguishable, identical quantum systems can most easily be explained on the basis of an example: the experiments described in [6], in which individual or else a number of $^{40}Ca^+$-ions can be stored in a linear ion trap lend themselves to this purpose. By way of example, if two $^{40}Ca^+$-ions are stored in the linear ion trap described in [6], the individual ions are localized in a spatial region which, to a good approximation, is approximately spherical with a diameter of approximately 2 μm. The two spatial regions $R_1$ (contains the ion 1) and $R_2$ (contains the ion 2) in this case have a spacing of approximately 5 lam. The boundary conditions to be observed during the operation of the linear ion trap in this case ensure that it is possible to exclude, with a probability bordering on certainty, that the two ions interchange their positions. Precisely this is the decisive point. The two ions can be considered distinguishable precisely if clearly distinguishable spatial regions can be assigned to these due to the boundary conditions in such a way that these are spatially isolated from one another. If the two spatial regions $R_1$ and $R_2$ overlap at any time, the two ions can, in general, no longer be considered to be distinguishable from this time forth.

This idea can now informally also be transferred to the situation depicted schematically in FIG. 1, in which two identical photons are incident on the symmetric beam splitter ST. To this end, it is then necessary, of course, to assign spatial regions to the two photons in a first step, which spatial regions describe where the individual photons are localized at a specific time. Since photons propagate with the speed of light, this must naturally also apply to the corresponding spatial regions. The smallest conceivable spatial regions are therefore spatial regions which move with the individual photons, correspond to the extent of the wave packets assigned to the individual photons (which wave packets are described by the respective states) in the direction of propagation and are set by the spatial emission characteristic of the respective source perpendicular to the propagation direction. It is furthermore necessary to note that a superposition state needs to be assigned to an individual photon after the latter has passed the beam splitter. Therefore, a corresponding spatial region needs to be assigned to each one of the two state components downstream of the beam splitter. Furthermore, it is well-established by experiment that the energy assigned to a photon is not split at the beam splitter. Therefore, the energy of a photon is either completely reflected or completely transmitted at the beam splitter. Therefore, downstream of the beam splitter, the energy assigned to a photon can always only be assigned to precisely one of the two state components. Here, it is impossible, as a matter of principle, to predict to which state component the energy of the photon needs to be assigned.

Therefore, the energy assigned to a photon is always localized in one of the “possible” spatial regions for the photon at this time. That is to say, it is localized either in the spatial region assigned to the reflected state component or in the spatial region assigned to the transmitted state component. In order to be able to keep the language as simple as possible, reference will also be made here to the “possible” spatial regions for an individual photon when the photon is still situated upstream of the beam splitter and, of course, only precisely one spatial region can be assigned thereto in that case.

Then, the following statement emerges for the situation schematically depicted in FIG. 1: the two photons, i.e. photon 1 emitted by the source Q1 and photon 2 emitted by the source Q2, can therefore be considered to be distinguishable at a specific time precisely if the possible spatial regions for photon 1 at this time do not overlap with the possible spatial regions for photon 2 at this time. If the spatial regions overlap after a specific time, the two photons can, in general, no longer be considered to be distinguishable from this time forth, depending on the degree of the overlap.

Figure 2:
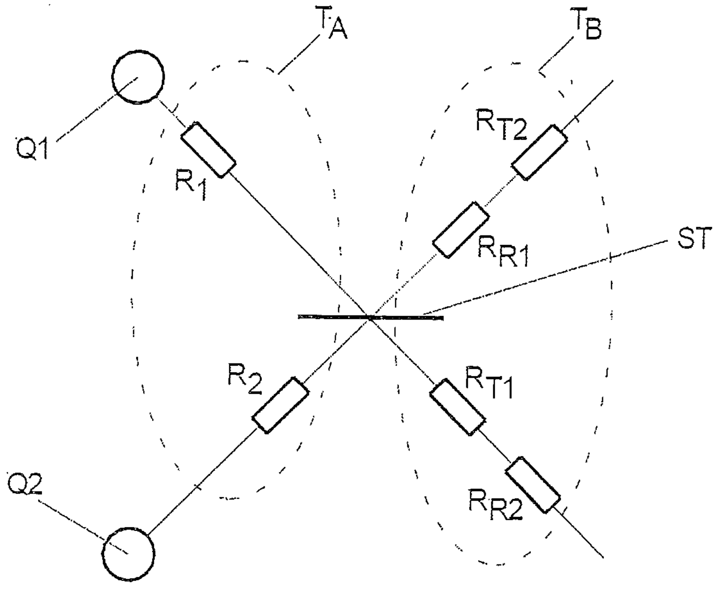
FIG. 2 shows spatial regions assigned to the two photons are still situated upstream of the beam splitter.

Therefore, on the basis of this idea, three cases can be distinguished for the situation schematically depicted in FIG. 1:

Case 1: The spatial regions assigned to the two photons are still situated upstream of the beam splitter (in this respect, see also FIG. 2): since the spatial regions $R_1$ (photon 1) and $R_2$ (photon 2) assigned to the two photons at a specific time $T_A$ can, due to the boundary conditions (the selected arrangement), only overlap when these reach the beam splitter as a matter of principle, the two photons can, with certainty, be considered to be distinguishable upstream of the beam splitter. Here, the times at which the two sources are emitted to the individual photons are unimportant.

Case 2: The spatial regions assigned to the two photons reach the beam splitter with such a time offset that the possible spatial regions for photon 1 do not overlap with the possible spatial regions for photon 2 on the beam splitter: in this case, the two photons can, with certainty, also be considered to be distinguishable downstream of the beam splitter since the possible spatial regions $R_{T1}$ and $R_{R1}$ for photon 1 downstream of the beam splitter naturally cannot, as a matter of principle, overlap with the possible spatial regions $R_{T2}$ and $R_{R2}$ for photon 2 downstream of the beam splitter as a result of the boundary conditions. Here, $R_{Ti}$ denotes the spatial region assigned to the transmitted state component of photon i (i=1, 2) at a specific time $T_B$ and $R_{Ri}$ denotes the spatial region which is assigned to the reflected state component of photon i at time $T_B$ (in this respect, see also FIG. 2).

Therefore, in accordance with Equation (4), the product state $\Psi_2$ emerges as outgoing state at the beam splitter in Case 2. A completely different situation arises if both sources each emit a photon simultaneously.

Case 3: Both sources each emit a photon simultaneously: in this case, the spatial regions assigned to the individual photons arrive simultaneously at the beam splitter. From the beam splitter, the possible spatial regions for photon 1 start to overlap with the possible spatial regions for photon 2. From the time at which the spatial regions assigned to the two photons have completely passed through the beam splitter, the possible spatial regions for photon 1 overlap maximally with the possible spatial regions for photon 2 ($R_{R1}=R_{T2}$ and $R_{T1}=R_{R2}$). Therefore, the two photons must be considered to be indistinguishable from this time forth.

Case 3 is the case which is relevant in this context. Since the two photons in this case have to be considered to be indistinguishable downstream of the beam splitter, the state $\Psi_2$ cannot be considered to be the outgoing state at the beam splitter since said state does not have the symmetry properties required for indistinguishable quantum systems. According to the spin-statistics theorem [7], which is valid in quantum physics, the outgoing state ${}^B\Psi_3$ at the beam splitter is obtained for indistinguishable photons (or for bosons in general) from the state by virtue of symmetrising the state $\Psi_2$. The state ${}^B\Psi_3$ is then given by $$ {}^B\Psi_3=i/2^{1/2}(|1>_2|1>_1+|0>_2|0>_1). \quad (6)$$

If this were to relate to two fermions instead of bosons, the state $\Psi_2$ would still have to be anti-symmetrised. Then, the following state would emerge in the case of fermions:

$$ {}^F\Psi_3=½^{1/2}(|0>_2|1>_1-1>_2|0>_1). \quad (7)$$

Therefore, the correct expression for the outgoing state at the beam splitter is only obtained after the state $\Psi_2$ was symmetrised in the case of bosons or anti-symmetrised in the case of fermions. Hence, only the application of the spin-statistics theorem on the state $\Psi_2$ leads to the correct description of the considered situation at the beam splitter ST.

If the previous considerations apply, it is possible to consider the application of the spin-statistics theorem to the state $Ø_2$ as a state transformation. The unitary operator which formally describes this state transformation can simply be determined by rewriting the state $\Psi_2$. With respect to the Bell basis, the following is obtained:

$$\begin{aligned}\Psi &= 1/4^{1/2}(i|1\rangle_2|1\rangle_1 + i|0\rangle_2|0\rangle_1 + |0\rangle_2|1\rangle_1 - |1\rangle_2|0\rangle_1) \\ &= 1/2^{1/2}(i\Phi_+ - \Psi_-) = e^{i\pi}/2^{1/2}(e^{-i\pi/2}\Phi_+ + \Psi_-) \\ &= e^{i\pi}/2^{1/2}(|A\rangle + |B\rangle).\end{aligned} \quad (8)$$

$$\text{with: } |A\rangle = e^{-i\pi/2}\Phi_+ \text{ and } |B\rangle = \Psi_-, \quad (9)$$

where $\langle A | B \rangle = 0$ applies.

Therefore, the state $\Psi_2$ can also be formally considered as an element of a two-dimensional vector space, which is spanned by the orthogonal state vectors |A> and |B>. If the unitary operator $U_{NLB}$ is defined on this vector space as per $$U_{NLB} = \frac{1}{\sqrt{2}} \begin{matrix} & \langle A| & \langle B| \\ |A\rangle & 1 & 1 \\ |B\rangle & -1 & 1 \end{matrix}, \quad (10)$$

the following is obtained:

$$U_{NLB}\Psi_2=e^{i\pi}|A>=i\Phi_+={}^B\Psi_3. \quad (11)$$

Therefore, the effect of the application of the spin-statistics theorem to the state $\Psi_2$ for bosons for the considered situation at the beam splitter can formally be described by means of the operator $U_{NLB}$. In the case where the two quantum systems are not bosons but feiinions, the following is immediately obtained:

$$U_{NLF}\Psi_2=e^{i\pi}|B>=-\Psi_-={}^F\Psi_3 \quad (12)$$

$$\text{where: } U_{NLF}=(U_{NLB})^{-1}. \quad (13)$$

Here, $U_{NLF}$ is given by the inverse operator to $U_{NLB}$. Hence, overall, the following equation emerges for the state transformation which transfers the incoming state into the outgoing state in the case of two identical bosons:

$$ {}^B\Psi_3=U_{NLB}U_{ST}|0,1> \quad (14)$$

and the following equation describes the case of two identical fermions:

$$ {}^F\Psi_3=U_{NLF}U_{ST}|0,1> \quad (15)$$

What emerges from the fact that the operators $U_{NLB}$ and $U_{NLF}$ transfer a product state into an entangled state is that these have to be nonlocal operators. The decisive question now is the following: can the operators $U_{NLB}$ and $U_{NLF}$ be considered to be interaction operators? Since the question as to whether every physical realizable, nonlocal, unitary operator describing a state transformation can be considered to be an interaction operator could not previously be answered in general terms within the framework of the formalism underlying quantum physics, all that remains is the option of considering each individual case separately. In the case of the above-described example, where two identical photons simultaneously impinge on the symmetrical beam splitter, it is easy to show that the operator $U_{NLB}$ cannot be considered to be an interaction operator: in order to be able to consider the operator $U_{NLB}$ to be an interaction operator, it is also necessary to be able to assign an interaction thereto. However, since it has previously not been possible to specify an interaction by means of which the two photons can interact at the beam splitter, the operator $U_{NLB}$ in this example cannot be considered to be an interaction operator either.

As this example shows, there therefore are physically realizable nonlocal, unitary operators describing a state transformation which cannot be considered to be interaction operators.

The fact that the above-described approach correctly describes the situation schematically depicted in FIG. 1 can also be seen if the situation is described within the formalism of the second quantization. The situation depicted schematically in FIG. 1 is discussed in great detail within the formalism of the second quantization in Chapter 6.8 (Equations (6.8.6) to (6.8.20)) in [17]. The equations specified there are valid quite generally. They allow not only a description of the above-described limit cases (Case 2 and Case 3), but also a description for the case where the wave packets assigned to the photons partly overlap at the beam splitter.

In the case where the interest is restricted to the two above-discussed limit values, the equations specified in [17] can be simplified. To this end, the notations and definitions introduced in [17] are adopted and the results are briefly reproduced below. Reference is made to [17] in respect of the details. If the two photons can be considered to be independent of one another, the incoming state at the symmetrical, lossless beam splitter ST can then be described by the state $$\begin{aligned}|IN\rangle &= \int dt \int dt' \xi(t)\xi(t')\hat{a}_1^+(t)\hat{a}_2^+(t')|0\rangle \\ &= \left(\int dt\xi(t)\hat{a}_1^+(t)\right)\left(\int dt'\xi(t')\hat{a}_2^+(t')\right)|0\rangle \\ &= \hat{a}_{1,\xi(t)}^+\hat{a}_{2,\xi(t')}^+|0\rangle = |1\rangle_{1,\xi(t)}|1\rangle_{2,\xi(t')}\end{aligned} \quad \text{(SQ. 1)}$$

According to the deliberations in [17], the two photons in the situation considered above can be considered to be independent of one another as long as they are still situated upstream of the beam splitter ST as the assumption was made for the sources Q1 and Q2 that these can be operated independently of one another. An indication for this assumption being valid is supplied by e.g. the experiments described in [18] as well.

After the two photons passed through the beam splitter, the quantum system can be described by the following state for the limit cases, considered here:

$$\begin{aligned}|OUT\rangle &= \int dt \int dt' \xi(t)\xi(t')[i/2(\hat{a}_3^+(t)\hat{a}_3^+(t') + \\ &\quad \hat{a}_4^+(t)\hat{a}_4^+(t')) + 1/2(\hat{a}_4^+(t)\hat{a}_3^+(t') - \hat{a}_3^+(t)\hat{a}_4^+(t'))]|0\rangle \\ &= [i/2(\hat{a}_{3,\xi(t)}^+\hat{a}_{3,\xi(t')}^+ + \hat{a}_{4,\xi(t)}^+\hat{a}_{4,\xi(t')}^+) + \\ &\quad 1/2(\hat{a}_{4,\xi(t)}^+\hat{a}_{3,\xi(t')}^+ - \hat{a}_{3,\xi(t)}^+\hat{a}_{4,\xi(t')}^+)]|0\rangle\end{aligned} \quad \text{(SQ. 2)}$$

If the wave packets assigned to the photons do not overlap at the beam splitter, the outgoing state at the beam splitter is obtained in accordance with $$|OUT_2\rangle = i/2(|1\rangle_{3,\xi,(t)}|1\rangle_{3,\xi,(t)} + |1\rangle_{4,\xi,(t)}|1\rangle_{4,\xi,(t')}) + \tfrac{1}{2}(|1\rangle_{4,\xi,(t)}|1\rangle_{3,\xi,(t')} - |1\rangle_{3,\xi,(t)}|1\rangle_{4,\xi,(t')}) + \quad \text{(SQ.3)}$$

The state transformation assigned to the conversion of the incoming state |IN> to the outgoing state $|OUT_2>$ (beam splitter property) then precisely corresponds to the state transformation described by the operator $U_{ST}$ (Equation (2)) within the formalism of the first quantization. As the deliberations in [17] show, the photons in this case can therefore also be considered to be distinguishable downstream of the beam splitter.

In the case where the two photons arrive at the beam splitter simultaneously, it is possible, using the equation $$|2\rangle_{i,\xi} = \tfrac{1}{2}^{1/2}\hat{a}^+_{i,\xi}|0\rangle, \text{ with } i=3,4, \quad \text{(SQ.4)}$$

to rewrite Equation (SQ. 2) as $$|OUT_3\rangle = i/2^{1/2}(|2\rangle_{3,\xi} + |2\rangle_{4,\xi}) + \tfrac{1}{2}(\hat{a}^+_{4,\xi,(t)}\hat{a}^+_{3,\xi,(t)} - \hat{a}^+_{3,\xi,(t)}\hat{a}^+_{4,\xi,(t')})|0\rangle. \quad \text{(SQ.5)}$$

Considering that $$\hat{a}^+_{4,\xi,(t)}\hat{a}^+_{3,\xi(t')} - \hat{a}^+_{3,\xi(t)}\hat{a}^+_{4,\xi(t')}) = [\hat{a}^+_{4,\xi(t)}, \hat{a}^+_{3,\xi(t')}] = 0 \quad \text{(SQ.6)}$$

applies in this case, the following expression is obtained for the outgoing state at the beam splitter:

$$|OUT_3\rangle = i/2^{1/2}(|2\rangle_{3,\xi} + |2\rangle_{4,\xi}). \quad \text{(SQ7)}$$

Therefore, the state $|OUT_3>$ corresponds precisely to the state ${}^{B}\Psi_3$ within the formalism of the first quantization. If the transition from Equation (SQ. 2) to Equation (SQ. 7) is considered to be the state transformation, it is possible to see that the effect of the commutator relation Equation (SQ. 6) consists of suppressing the state components in Equation (SQ. 2) which are only possible for distinguishable quantum systems. The application of the commutator relation in conjunction with Equation (SQ. 4) on the state |OUT> therefore corresponds precisely to the application of the operator $U_{NLB}$ on the state $\Psi_2$ within the formalism of the first quantization.

What follows from this is that the two identical photons must, within the formalism of the second quantization, be considered to be indistinguishable downstream of the beam splitter if they arrive at the beam splitter simultaneously.

What these deliberations show is that the description within the formalism of the second quantization therefore corresponds to the description within the formalism of the first quantization. However, what [17] was not able to identify either is that there are physically realizable, nonlocal, unitary operators describing a state transformation which cannot considered to be interaction operators, as is demonstrated by this example.

However, since the spatial regions assigned to the two photons spatially overlap at the beam splitter in this example, it is not possible, with certainty, to exclude the possibility of a previously undiscovered interaction, by means of which the two photons could interact at the beam splitter, nevertheless being discovered at some point, and so it would be desirable to have an example available, in which the involved quantum systems are localized in a spatial regions which can clearly be distinguishable spatially and in which the spacing between these spatial reasons can be selected to be so great that, in principle, it is possible to exclude the possibility of the involved quantum systems being able to interact with one another. An appropriate example could be the method for the interaction-free entanglement of quantum systems, proposed in Section VII in [1]. If the latter could successfully be realized, this would be of interest not only for the realization of scalable quantum computers, but it would also be of fundamental importance for a very central question of quantum physics.

The relevant question, and how it is linked to the question of whether there are physically realizable, nonlocal, unitary operators which describe a state transformation and which cannot be considered to be interaction operators, should be briefly discussed in the following.

An essential precondition for the formulation of "physical laws" is that there are causal relationships between events. Causality means that a clear distinction can be made between cause and effect. The principle of causality is based on the following ideas: (I.): "Time" can be introduced as a variable, and it has the following properties: (i): the property of order known from mathematics. As is the case with two real numbers, it must always be possible to be able to state which is greater of two times (in general, this is not possible for two complex numbers). (ii): time must be a directed, advancing variable. It may never "stop" or run "backwards". And (II.): what is cause and what is effect must not depend on the location or time of the observation. In relation to the question of what is cause and what is effect, the result should always be the same, independently of when or where an experiment is carried out, as long as the experiment is carried out using comparable boundary conditions.

If the assumption is made that causality is a principle realized in nature, the question relating to the "level" at which causality occurs naturally arises. Is it necessary to consider causality as an elementary "natural principle," or does causality only occur as an "emergent property" of sufficiently complex systems?

An example of an emergent property is the viscosity property known from fluid mechanics [8]. By way of example, if a gas flowing through a pipe with a circular cross section is considered, it is possible to specify two limit cases for the flow: one limit case is the range of molecular flow. It always occurs if the free path length is very much greater than the diameter of the pipe. In this case, there is no interaction (there are no collisions) between the individual gas particles. If the pressure is now increased, the gas particles can interact with one another with increasing frequency by collisions as a result of increasing pressure since the free path length reduces with increasing pressure. If the free path length becomes very much smaller than the pipe diameter as the pressure increases, the second limit case—the range of viscous flow—is present. Therefore, a new property is formed therefrom only once a sufficient number of gas particles interact sufficiently frequently. The new property is the viscosity. It cannot be ascribed either to an individual gas particle or to the totality of the gas particles situated in the pipe for as long as these cannot interact with one another. Therefore, viscosity is an emergent property. An example for an elementary natural principle is the superposition principle, which is valid in quantum physics.

The fact that answering the question as to whether causality needs to be considered to be an elementary natural principle or whether causality only occurs as an emergent property of sufficiently complex systems is of central importance to the fundamentals of quantum physics has been seen, for a number of years now, within the scope of searching for a theory of quantum gravitation [9]. The best-known approach is string theory. The approach of string theory attempts to capture all known interactions within the scope of a unified theoretical description. Therefore, string theory could also enable the unification of the general theory of relativity with quantum physics in order to form a theory of quantum gravitation. However, due to the complicated mathematical structure thereof, string theory still is a long way off, unfortunately, being able to provide any verifiable results. However, there are also approaches for a theory of quantum gravitation which are verifiable. Only these should be considered here. One approach is "Euclidean quantum gravitation"; another approach is "causal dynamic triangulation" [10]. Both approaches are restricted to the description of empty space time. In Euclidean quantum gravitation, space and time are given the same mathematical treatment. As a result of this, causality does not appear as an elementary natural principle in Euclidean quantum gravitation. This is also the essential difference to the approach of causal dynamic triangulation. Therein, the time is implemented explicitly in advance as a directed, advancing variable. Therefore, the approach of causal dynamic triangulation assumes that empty space time already has a causal structure within the meaning of an elementary natural principle. By contrast, in the approach of Euclidean quantum gravitation, the assumption is made that a causal structure only forms within the meaning of an emergent property as a result of the underlying elementary superposition principle. Both approaches were checked by means of numerous, complicated computer simulations. The result of these simulations is remarkable. While the simulations for Euclidean quantum gravitation were found to be unstable as a matter of principle, the simulations for causal dynamic triangulation were not only stable as a matter of principle, they also supplied the correct dimensions and the correct geometry for space time in the classical case.

This result is remarkable for the following reason: the second law of thermodynamics is the only "natural principle" that formulates boundary conditions which lead to a directed, advancing variable: entropy. In a nutshell, the second law of thermodynamics states that entropy must increase in the case of irreversible processes in a closed system. Irreversibility and the increase in entropy connected therewith are currently the only known criteria enabling a clear distinction between past and future. Although it has previously not been possible to show that entropy or time is an emergent property, it appears that the idea to have prevailed is that both entropy and time are emergent properties, presumably due to the historical fact that entropy was introduced within the scope of thermodynamics. However, this idea is now clearly fundamentally put into question as result of the success of the approach of causal dynamic triangulation.

If the assumption is made that the approach of causal dynamic triangulation is correct, the question naturally arises as to why no experiment supporting this approach was found previously? The answer to this question is surprisingly simple. It was clearly simply overlooked! In order to be able to understand what experiment this refers to, it is first of all necessary to consider by what means it would be possible to identify that causality is an elementary natural principle.

Since irreversibility is the only known criterion for causality up until now, the considered process should be irreversible and the involved quantum systems should form a closed system. Furthermore, there should be no interactions between the involved quantum systems in order to be able to ensure that the causal structure of empty space time is responsible for the irreversibility.

At first sight, it appears hardly conceivable that there could be an experiment which satisfies these boundary conditions. However, this experiment exists and, moreover, it is a very simple and therefore very straightforward experiment. It is the example, already discussed above, of when two identical photons impinge simultaneously on a symmetric beam splitter (Case 3 in the example above). The fact that the state transformation impinging on the beam splitter is irreversible in Case 3 can be seen most easily from an information-theoretical point of view. Due to the boundary conditions, the two identical photons must be considered to be distinguishable upstream of the beam splitter as the spatial regions $R_1$ and $R_2$ assigned to the two photons cannot, as a matter of principle, overlap upstream of the beam splitter. However, as soon as the two photons have passed through the beam splitter and the possible spatial regions for photon 1 overlap maximally with the possible spatial regions for photon 2 ($R_{R1}=R_{T2}$ and $R_D=R_{122}$), the two photons can, as a matter of principle, no longer be considered to be distinguishable. However, the loss of the distinguishability is clearly an irreversible process. Moreover, the two photons can be considered to be a closed system. Although the two photons do not form a closed system in the strict sense in respect of conservation of momentum and therefore not in respect of conservation of energy either, the two photons can nevertheless be considered to be a closed system as long as the beam splitter is sufficiently large (and therefore heavy) and operated at room temperature since it is impossible, as a matter of principle, under these boundary conditions (which are conventional in a laboratory) to decide which photon was reflected and which one was transmitted at the beam splitter. Since, according to current knowledge, there is no interaction by means of which the two photons can interact with one another at the beam splitter, the last boundary condition is also satisfied.

Nevertheless, due to the fact that the spatial regions assigned to the two photons spatially overlap at the beam splitter, it is possible, in respect of this example, to raise the objection that there is indeed an interaction between the two photons at the beam splitter but that it just has not been found yet. Therefore, an example in which the involved quantum systems are localized in spatially clearly separated spatial regions and in which the distance between the quantum systems can be selected to be so large that an interaction can, as a matter of principle, be excluded would be desirable. An appropriate example could be the method, proposed in Section VII in [1], for interaction-free entanglement of quantum systems, provided it can be realized successfully. This method will be described in still more detail below.

However, if the assumption is made that there is no interaction between the two photons at the beam splitter, this example shows two things: firstly, it is an indication for causality being an elementary natural principle and the approach of causal dynamic triangulation being correct. Herein, it is also possible to see the fundamental importance of physically realizable, nonlocal unitary operators which describe a state transformation and which cannot be considered to be interaction operators. If it were possible to show that the operator $U_{NLB}$ describes an interaction between the two photons, it would not be possible to put forth this example as an indication for the causal structure of empty space time being responsible for the irreversibility. Secondly, this example disproves the generally accepted idea that each physically realizable unitary operator which describes a state transformation describes a reversible process! Both circumstances were previously not identified in the physical literature.

However, the unitary operator $U_{NLB}$ is not the only unitary operator describing a state transformation which describes an irreversible process. It is possible to quickly find further examples once it is known what one needs to look out for.

Figure 3:
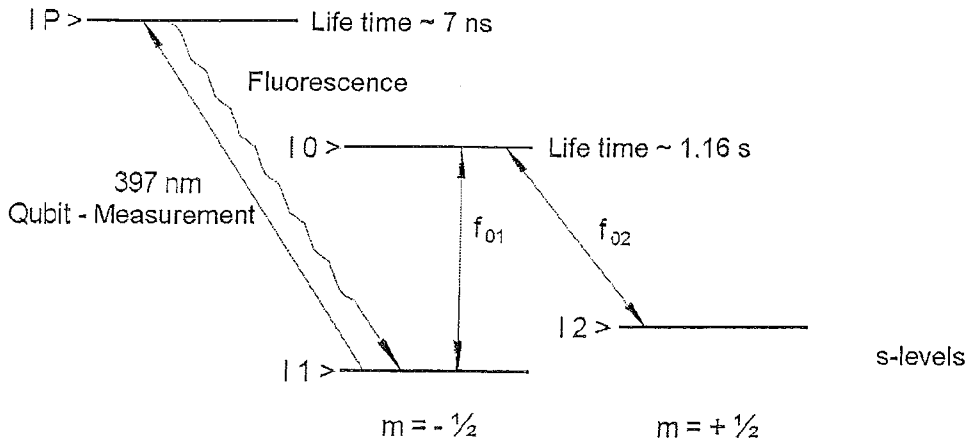
FIG. 3 shows energy levels, relevant to experiments described in [6], of the $^{40}Ca^{+}$-ions used there to show the possibility of storing individual ions, or else a plurality of ions.

This should be made clear in the following text on the basis of an example. The experiments described in [6] lend themselves to this end. The linear ion trap described in [6] offers the possibility of storing individual ions, or else a plurality of ions. The energy levels, relevant to these experiments, of the $^{40}Ca^{+}$-ions used there are depicted schematically in FIG. 3. Individual quantum bits (qubits) are realized by means of the states |1> (ground state) and |0> (first excited state). Using a manipulation laser (729 nm), it is possible to prepare the stored irons into the desired states in a defined manner. The preparation process used can be considered to be analogous to the preparation method for spin ½-systems known from NMR [14] (nuclear magnetic resonance) (in this respect, see also [1], Section III). In order to be able to keep the discussion as simple as possible, the assumption is made in the following that only one $^{40}Ca^{+}$-ion is situated in the linear ion trap and that the latter is only manipulated by laser light with the transition frequency $f_{01}$ (the carrier frequency) (in this respect, see [6]).

If the ion is in an energetic eigenstate, knowledge about the energetic properties of the ion is maximal. It is possible to say with certainty what energy can be assigned to the ion. If, proceeding from an energetic eigenstate (e.g. proceeding from the ground state |1>), the $^{40}Ca^{+}$-ion is now prepared in a superposition state, knowledge about the energetic properties of the ion is lost as a matter of principle (in this respect, see also [1], Section III). For a superposition state of the form $½^{1/2}$ (|0>+$e^{i\Phi}$|1>), with any real phase $\phi$, knowledge about the energetic properties of the ion then is clearly minimal. However if knowledge about the energetic properties of the ion is lost as a matter of principle when transferring an ion, proceeding from an energetic eigenstate, into a superposition state, the expectation would actually be that the corresponding preparation process is irreversible. However, the preparation steps described in [6] are clearly reversible. The decisive question now is: why are the considered preparation steps reversible? This question can be answered most easily from an information-theoretical point of view:

In the experiments described in [6], each preparation step consists of an individual laser pulse of the manipulation laser. Visually, the effect of a laser pulse on the ion can be described by means of the Bloch sphere (in this respect, see [6], page 66). An individual preparation step then corresponds to the rotation of the Bloch vector about a certain angle and about a certain axis of rotation. The angle of rotation of the Bloch vector is set by the temporal intensity profile and the pulse duration of the laser pulse. The axis of rotation of the Bloch vector is selected by the phase of the laser light. The axes of rotation (and therefore the orientation of the Bloch sphere) are defined by the first laser pulse which illuminates the ion since the first laser pulse always corresponds to a rotation of the Bloch vector about the (−y)-axis of the Bloch sphere (details in this respect are found, for example, in [11]). As a simplification, the effect of the first laser pulse of the manipulation laser on the ion can be imagined to be such that this sets the phase of the exciting laser light relative to the phase of the oscillating electric moment of the ion, which is induced into the ion by the exciting laser light. In relation to this so-defined "relative phase", the axes of rotation are then set for all subsequent laser pulses (by means of the phase of the laser light of the manipulation laser).

As long as the relative phase is set, it is possible (at least in principle) to carry out arbitrarily many preparation steps successively on the ion. However, if the information relating to the relative phase is lost between two preparation steps as a matter of principle (for example, because the trial structure is not sufficiently stabilized mechanically or thermally), this also, as a matter of principle, removes the possibility of preparing an ion into a specific state in a targeted manner by means of a plurality of successive preparation steps. The only preparation steps which can be predicted in terms of their effect experimentally then correspond to rotations of the Bloch vector about the (−y)-axis, provided said steps start from an energetic eigenstate. By way of example, if, proceeding from the ground state |1>, the ion is prepared by means of a $\pi/2$-pulse into the superposition state $½^{1/2}$ (|0>+|1>), then this preparation step (this state transformation) is clearly an irreversible process. This is because the statement: "the ion is in the state $\frac{1}{2}^{1/2}$ (|0>+|1>) after the first laser pulse" always refers to the respective laser pulse of the manipulation laser. However, without information relating to the relative phase, the orientation of the Bloch sphere is a variable which, from a metrological point of view, is inaccessible as a matter of principle. The result of this is that, in principle, it is impossible to transfer the ion into the ground state again in a targeted manner by means of a further preparation step. The unitary operator which can be assigned to this state transformation therefore describes an irreversible process if there is no information at all available about the relative phase.

By contrast, preparation steps which transfer the ion from one energetic eigenstate into another energetic eigenstate are reversible as a matter of principle since it is not possible to assign an induced oscillating electric moment to the energetic eigenstates. The phase of the exciting laser light can therefore merely have an influence on the global phase of the state of the ion. However, since this cannot be observed as a matter of principle, the corresponding preparation steps can be considered to be reversible.

However, if the previous deliberations apply, a very fundamental problem arises: the generally accepted idea that the "von Neumann entropy $S_{VN}$" provides an adequate description for the entropy of a quantum system cannot be correct! The von Neumann entropy assigns all pure states (and only these are considered here) the value $S_{VN}=0$ (in this respect, see e.g. [4]). However, according to the preceding deliberations, the entropy of a $^{40}Ca^{+}$-ion in an energetic eigenstate should differ from the entropy assigned to the ion in a superposition state and should assume the smallest value possible for the quantum system for an ion in an energetic eigenstate.

This can easily be appreciated. The physical variable entropy was historically introduced within the scope of thermodynamics. Entropy is not a variable which can be measured directly. It is only possible to detect changes metrologically. Within the scope of thermodynamics, it is possible to consider the entropy as a statistical variable. The latter can then be interpreted as a measure for the accessible phase space volume of the considered physical system. When considered from an information-theoretical point of view, the entropy of a system can be considered to be a measure for the not available knowledge about the system (in this respect, see, for example, [4], [12]). If the system is modified by a preparation step and if this changes the knowledge unavailable about the system, it is also necessary for the entropy of the system to change. If the not available knowledge about the system becomes larger, the entropy increases. If the not available knowledge about the system becomes smaller, the entropy decreases.

This classical information theoretical approach can easily be explained on the basis of an example. Suppose the physical system is a die which, at the start, should always lie on the table with one and the same orientation. Clearly, the knowledge about the system then is maximal. If the die is taken and thrown (a preparation step is carried out), six equally probable results are possible. The preparation step (throwing a die) therefore generates a statistical mixture. An individual result can therefore only be predicted with a certain probability (in this case 1/6). Therefore, the not available knowledge about the system increases in the preparation process (throwing a die). The "Shannon entropy $S_S$" (average entropy) can be used as a measure for this loss of information [4]. The Shannon entropy describes the average amount of information required to characterize an event. If all events occur with the same probability (which is the case when throwing a die), the Shannon entropy corresponds precisely to the entropy of the system within the meaning of the interpretation of entropy from thermodynamics. Since the Shannon entropy underlines the binary system as a "unit of measurement" for the information, that Shannon entropy specifies how many "bits" are required on average in order to be able to characterize an event.

This classical information-theoretical approach to entropy can easily be transferred to quantum physics. In order to be able to do this, it is only necessary to consider how "knowledge" about the quantum system (except for the available a priori knowledge about the quantum system) can be present. To this end, it is helpful once again to recall what interpretation is assigned to the variable "state" within the scope of the standard interpretation of quantum physics (in this respect, see [4], page 30):

"The state of a quantum system is assigned to the special preparation method carried out. A quantum state is understood to be that mathematical (!) object which renders it possible to uniquely calculate the probabilities for the results of all possible measurements on systems which have run through the associated preparation method. Therefore, the quantum state characterizes the preparation method."

The only possibility for obtaining information (knowledge) about a quantum system consists of carrying out measurements on the quantum system. The events assigned to the quantum system are therefore given by the possible measurement values. The state of the quantum system is not directly accessible from a metrological point of view. As shown in [1], section III, the possible "energetic properties" of the quantum systems ($^{40}Ca^{+}$-ions) considered here are uniquely set by the possible measurement values. Information (knowledge) about the possible energetic properties assigned to the quantum system is therefore directly accessible via the possible measurement values (events). Therefore, the classical information-theoretical approach can also be applied to these quantum systems if it is based on the interpretation for the possible measurement values proposed here.

The fact that the entropy must assume the smallest possible value for the quantum system for an ion in an energetic eigenstate and that the value of the entropy must be greater for an ion in a superposition state can now easily be appreciated: in order to be able to undertake measurements on the ion, the latter must be illuminated by the analysis laser (397 nm). Then, in principle, two measurement results (events) are possible [6]:

Event 1: The ion fluoresces. If this event is present, it is clear that the ion is in the energetic ground state |1> after the measurement.

Event 2: The ion does not fluoresce. If this event is present, it is clear that the ion is in the first energetically excited state |0> after the measurement.

If the ion is in an energetic eigenstate, the quantum system is already completely characterized in respect of the energetic properties. Therefore, the value "0" (the smallest possible value) must be assigned to the quantum system for entropy. If, proceeding from an energetic eigenstate, the quantum system is transferred into a superposition state, both events that are possible, in principle, for the quantum system can occur with a probability that is set by the state. Therefore, an individual event can only be predicted with a certain probability. Therefore, the not available knowledge about the energetic properties of the quantum system increases during this preparation process. However, this then means that the entropy of the quantum system must have increased during this preparation step. The only difference in relation to classical systems merely consists of the fact that the totality of possible measurement values (events) for the quantum system may not be considered to be a statistical mixture since a pure state is assigned to the quantum system.

The same result is also arrived at by the following line of reasoning: if the assumption is made that it is also possible to assign an entropy to the quantum systems considered here, then it is obvious to demand that the second law of thermodynamics also applies to these quantum systems. According to the considerations above, a preparation step, which transfers an ion into a superposition state proceeding from an energetic eigenstate, must be considered to be an irreversible process if there is no information at all about the relative phase. The quantum system (ion) can also be considered to be a closed system. Although the quantum system does not form a closed system in the strictest sense in respect of the conservation of energy, and therefore not in respect of conservation of momentum either, as a result of the ion being able to exchange energy with the manipulation laser during a pulse thereof. The quantum system can nevertheless be considered to be a closed system when considered from an information-theoretical point of view since the boundary conditions of the experiments described in [6] make it, as a matter of principle, impossible to decide whether an ion has exchanged energy with the laser pulse of the manipulation laser (in this respect, see also [1], Section III). However, according to the second law of thermodynamics, the entropy of the ion must have increased in this case. If the assumption is made that entropy is also a well defined variable in quantum physics, it must not however depend on the specifically selected preparation process. The same entropy must always emerge for the quantum system, independently of whether said preparation process is reversible or irreversible. However, this then means that the entropy must assume the smallest possible value for the quantum system for an ion in an energetic eigenstate and that the value of the entropy must be greater for an ion in a superposition state.

An obvious information-theoretical approach to being able to formally describe the entropy of the states considered here in an exemplary manner therefore clearly is the classical Shannon entropy $S_S$, since the latter can be applied directly to quantum physics if the above proposed interpretation is set out as the basis for the possible measurement values. A response to the question as to how entropy can formally be introduced within the scope of quantum physics in all generality is still explained in detail elsewhere.

In order to be able to conceptually distinguish between the classical Shannon entropy $S_S$ and the Shannon entropy applied to quantum systems, the latter is referred to as "generalized Shannon entropy $S_{GS}$" (generalized Shannon entropy) in the following text. The latter can then be defined analogously to classical Shannon entropy:

$$S_{GS}(QS)=-\Sigma_i p_i \log_2(p_i) \quad (16)$$

Here, the index i denotes the possible events. The probabilities $p_i$ with which these occur are uniquely set by the state of the quantum system QS which corresponds to the i-th event by means of the probability amplitudes $a_i$, which are assigned to the respective state component, by means of the relation:

$$p_i=|a_i|^2 \quad (17)$$

(by means of the square of the absolute value of $a_i$). For improved understanding, a few examples should briefly be provided in this respect. If only one ion is in the linear ion trap, two events are possible as a matter of principle: 1.): Event 1 and 2.): Event 2 (see above).

Example 1

The ion is in the state |1>. In this case, only Event 1 is possible. The latter occurs with certainty. Therefore, $p_1=1$. Therefore, the following value emerges for the entropy $S_{GS}$:

$$S_{GS}(|1>)=0. \quad (18)$$

Example 2

The ion is in a superposition state of the form $½^{1/2}(|0>+e_{i\phi}|1>)$, with an arbitrary real phase φ. In this case, two events are possible. 1.): Event 1 and 2.): Event 2. Both have equal probability. Therefore, $p_1=p_2=½$ applies. Therefore, the following value emerges for the entropy $S_{as}$:

$$S_{GS}(½^{1/2}(|0>e^{i\phi}|1>))=1. \quad (19)$$

By way of example, if two ions are in the linear ion trap, the following situation emerges. In principle, 4 events are then possible:

Event 2.1: Ion 1 fluoresces and ion 2 fluoresces. If this event occurs, one knows that the state $|1,1>=|1>_2|1>_1$ must be assigned to the quantum system (the two ions) after the measurement. Here, the indices denote the two ions (in this respect, see [6]).

Event 2.2: Ion 1 does not fluoresce and ion 2 does not fluoresce. If this event occurs, one knows that the state |0,0> must be assigned to the quantum system after the measurement.

Event 2.3: Ion 1 fluoresces and ion 2 does not fluoresce. If this event occurs, one knows that the state |0,1> must be assigned to the quantum system after the measurement.

Event 2.4: Ion 1 does not fluoresce and ion 2 fluoresces. If this event occurs, one knows that the state |1,0> must be assigned to the quantum system after the measurement.

Example 3

The quantum system is in the state |0,0>. In this case, only event 2.2 is possible. The latter occurs with certainty. Therefore, $p_1=1$. Therefore, the following value emerges for the entropy $S_{GS}$:

$$S_{GS}(|0,0>)=0. \quad (20)$$

Example 4

The quantum system is in the state $$\Psi_{21}=½^{1/2}(|0>_2+e^{i\phi}|1>2)|1>_1 \quad (21)$$

with an arbitrary real phase φ. In this case, two events are possible: 1.) Event 2.1 and 2.): Event 2.3. Both have equal probability. Therefore, $p_1=p_2=½$. Therefore, the following value emerges for the entropy $S_{GS}$:

$$S_{GS}(\Psi_{21})=1. \quad (22)$$

Example 5

The quantum system is in the state $$\Psi_{23}=¼^{1/2}(|0>_2+e^{i\phi}|1>_2)(|0>_1+e^{i\theta}|1>_1) \quad (23)$$

with arbitrary real phases φ, θ. In this case, four events are possible: 1.) Event 2.1, 2.): Event 2.2, 3.): Event 2.3 and 4.):

Event 2.4. All have equal probability. Therefore, $p_1=p_2=p_3=p_4=1/4$. Therefore, the following value emerges for the entropy $S_{GS}$:

$$S_{GS}(\Psi_{23})=2. \tag{24}$$

Example 6

The quantum system is in the maximally entangled Bell state $$\Psi\_=1/2^{1/2}(|1,0>-|0,1>) \tag{25}$$

In this case, two events are possible: 1.) Event 2.3 and 2.): Event 2.4. Both have equal probability. Therefore, $p_1=p_2=1/2$. Therefore, the following value emerges for the entropy $S_{GS}$:

$$S_{GS}(\Psi\_)=1. \tag{26}$$

Analogously, the following is obtained for the other Bell states $\Psi_+$, $\Phi\_$ and $\Phi_+$ $$S_{GS}(\Psi_+)=S_{GS}(\Phi\_)=S_{GS}(\Phi_+)=1. \tag{27}$$

It is easily possible to verify that the entropy $S_{GS}$ for product states is an additive variable. However, this does not apply to entangled states. By way of example, if a quantum system is considered in a Bell state (BZ) and only events possible at a single ion are evaluated (the other ion is ignored), the following is obtained:

$$S_{GS}(\text{Ion 1 } BZ)=S_{GS}(\text{Ion 2 } BZ)=1 \tag{28}$$

and therefore $$S_{GS}(BZ)=1\neq S_{GS}(\text{Ion 1 } BZ)+S_{GS}(\text{Ion 2 } BZ)=2. \tag{29}$$

The entropy $S_{GS}$ can clearly also be applied directly to the situation described above, in which two identical quantum systems impinge on a symmetrical beam splitter. However, the entropy $S_{GS}$ differs quite fundamentally in one point from the classical Shannon entropy $S_S$. While the possible events have to be distinguishable for the classical situation, this does not apply here due to the definition of the entropy $S_{GS}$. This can be seen if, for example, two identical spin ½ systems simultaneously impinge on the symmetrical beam splitter.

In order to be able to understand the method, proposed in [1], Section VII, for interaction-free entanglement of quantum systems, it is helpful to once again look at the example already discussed above, in which two identical photons impinge simultaneously on a symmetrical beam splitter (Case 3 in the example above), in more detail. An essential precondition for the following deliberations lies in finding a characterization, which is as abstract as possible, of the preparation process, which is assigned to the operator $U_{NLB}$ and which transfers the quantum system, proceeding from the product state $\Psi^1{}_2$, into the entangled state ${}^B\Psi_3$ in accordance with $$\begin{aligned} U_{NLB}\Psi_2 &= U_{NLB}(1/4^{1/2}(i|1\rangle_2|1\rangle_1 + i|0\rangle_2|0\rangle_1 + |0\rangle_2|1\rangle_1 - |1\rangle_2|0\rangle_1)) \\ &= i\Phi_+ = {}^B\Psi_3 \end{aligned} \tag{30}$$

(in this respect, see also Equation (10) and Equation (11)). As shown in [1], Section VII, this must differ very fundamentally from the preparation processes described in [6]. While the individual quantum systems (ions) can be manipulated in a targeted manner in the preparation processes described in [6], it is clearly impossible, as a matter of principle, to manipulate individual quantum systems (photons) in a targeted manner in the preparation process described by the unitary operator $U_{NLB}$. It is also, as a matter of principle, impossible to influence the preparation process as such in a targeted manner. If two photons simultaneously impinge on the symmetric beam splitter, there is no parameter by means of which the preparation process could be controlled. A further difference to the preparation processes described in [6] consists of the preparation process, which is described by the operator $U_{NLB}$, transferring an "elementary quantum system" (in the state $\Psi_2$) into an "energetically represented" quantum system (which is then present in the state ${}^B\Psi_3$). In the preparation processes described in [6], an energetically represented quantum system is always transferred into an energetically represented quantum system. For an energetically represented quantum system, one of the energetic properties which are possible in principle is always in fact realized and directly accessible from a metrological point of view by means of the possible measurement values on the quantum system (see above). There are only "possibilities" for an elementary quantum system, but none of these possibilities is in fact realized. The terms "energetically represented" and "elementary" quantum system are explained in great detail in the Sections II, III and IV in [1]. Formulated in a slightly simplified manner, an elementary quantum system for the quantum system (the two photons) in the state $\Psi_2$ considered here can be understood to mean a quantum system in which the energy of the two photons has not yet been assigned to a state component. The energy of the two photons has been assigned to a state component in the energetically represented quantum system in the state ${}^B\Psi_3$ (and also in the incoming state |0,1>). However, it is impossible, as a matter of principle, to state to which state component the energy has been assigned if there are a plurality of possibilities (state components) (like in the state ${}^B\Psi_3$).

The preparation process which is assigned to the operator $U_{NLF}$ (in this respect, see Equation (12) and Equation (13)) can be characterized in a completely analogous manner. In [1], Section VII, it is then hypothesised that this abstract characterization of the preparation processes which are assigned to the operators $U_{NLB}$ and $U_{NLF}$ is applicable not only to the considered situation at the symmetrical beam splitter, but is valid in a completely general manner. Therefore, the method, as proposed in [1], in Section VII, for interaction-free entanglement of quantum systems, in which two identical spin ½ systems are considered, is based on the following hypothesis:

Hypothesis: if a state of the form $\Psi_2$ can be assigned to a quantum system consisting of two identical spin ½ systems, the operator $U_{NLF}$ can be physically realized precisely whenever the quantum system is present as an elementary quantum system and there is a preparation process which transfers the quantum system into an energetically represented quantum system and satisfies the following conditions: (A): it must, as a matter of principle, be impossible to manipulate an individual quantum system (spin ½ system) in a targeted manner and (B): it must, as a matter of principle, be impossible to influence the preparation process as such in any way.

Any preparation process satisfying conditions (A) and (B) then transfers the state $\Psi_2$ into the state ${}^F\Psi_3$.

The method, proposed in [1], in section VII, for interaction-free entanglement of quantum systems is then based on the following deliberation: the considered spin ½ systems should be at rest and the distance between these should be so large that they cannot interact. Furthermore, the assumption is made that a homogeneous magnetic field $B_z$ can be superposed in the z-direction on both systems. It should be possible to switch said magnetic field on and off as desired. When the magnetic field $B_z$ is switched on, the energy difference between the two energetic eigenstates of the spin ½ systems is then given by $\Delta E_z = 2\mu B_z$ (in this respect, see [1], section IV). Let the energetically lower energetic eigenstate of the i-th system (i=1, 2) be denoted by $|1>_i$ and the energetically higher eigenstate be denoted by $|0>_i$. At the start, the magnetic field is switched off and the quantum system consisting of the two spin ½ systems is to be present in the product state $\Psi_2$ Equation (5). Since the two energy levels coincide when the magnetic field is switched off, the quantum system has no energetic representation. The quantum system is therefore to be considered to be an elementary quantum system. The transfer of an elementary quantum system into an energetically represented quantum system may be considered to be a preparation step (in this respect, see [1], Section IV). Said preparation step can be realized by virtue of the magnetic field. $B_z$ being switched on. The boundary condition (R3) should be satisfied for the switching-on process of the homogeneous magnetic field $B_z$:

$$\Delta t_S < t_{max} = h/(4\pi\Delta E_z/2), \tag{R3}$$

where $\Delta t_S$ denotes the time required for switching on the magnetic field, h denotes the Planck constant and $t_{max}$ denotes the maximum possible time predetermined by the energy/time uncertainty principle (in this respect, see also [1], Section VII).

If the magnetic field $B_z$ is now switched on in such a way that boundary condition (R3) is satisfied, the preparation step realized by the switching-on process of the homogeneous magnetic field $B_z$ satisfies the conditions required by the underlying hypothesis in order to be able to physically realize the operator $U_{NLF}$. This is due to the following: condition (A) is satisfied, since the assumption was made that the magnetic field $B_z$ is homogeneous and therefore the same magnetic field always acts on both spin ½ systems at all times. Condition (B) is satisfied, since the boundary condition (R3) ensures that no defined energy can be assigned to the energetic eigenstates of the systems during the switching-on process (i.e. for times $<t_{max}$) and therefore no temporal state development can be assigned to the quantum system either. As a result of this, it is impossible, as a matter of principle, to influence the preparation process in a targeted manner. If the underlying hypothesis is correct, the quantum system must therefore be present after the switching-on process as an energetically represented quantum system in the state ${}^F\Psi_3$.

The very fundamental question now is what happens physically when the switching-on process of the magnetic field B, occurs while observing the boundary condition (R3). What physical process needs to be assigned to this preparation step? Since the process of "coherently coupled vacuum fluctuations", which is described in [1], Section V (and was first postulated in [13]), may occur during the switching-on process of the magnetic field $B_z$ when observing the boundary condition (R3), it was hypothesized in [1] that the process of coherently coupled vacuum fluctuations occurs with certainty under these boundary conditions. In [1], a coherently coupled vacuum fluctuation is understood to mean a process in which one of the involved quantum systems removes the energy $\mu B_z$ from the vacuum by means of a virtual photon during a switching-on process of the magnetic field $B_z$ (while observing the boundary condition (R3)) and the other quantum system emits the energy $\mu B_z$ to the vacuum in the form of a photon. Here, it is impossible, as a matter of principle, to decide which quantum system takes up energy and which quantum system emits energy. From a physical point of view, the process of the coherently coupled vacuum fluctuations can also be interpreted in such a way that the spins of the involved quantum systems fold over simultaneously here. However, strictly speaking, this assumption was not justified in [1]. Furthermore, the question arises as to why a physical process which has not been observed previously should be required at all in order to be able to realize the method, proposed in Section VII in [1], for interaction-free entanglement of quantum systems?

At least this question can now be answered easily: according to the information-theoretical approach to the entropy developed above, it is necessary to assign the following value for the entropy to an elementary quantum system $$S_{GS}(\text{elementary quantum system})=0, \tag{31}$$

since, when the magnetic field is switched off ($B_z=0$), $\Delta E_z = 2\mu B_z = 0$ applies and therefore the energetic eigenstates of the considered spin ½ systems coincide energetically. Therefore, an elementary quantum system is already characterized in a completely energetic manner. In the following text, an elementary quantum system is denoted by the index "el" and an energetically represented quantum system is denoted by the index "en". The same is to apply to the states assigned thereto. If the quantum system is in the "elementary" initial state ${}_{el}\Psi_2$ when the magnetic field is switched off, it said state must then be assigned the following entropy:

$$S_{GS}({}_{el}\Psi_2)=0. \tag{32}$$

If the quantum system is transferred into the "energetically represented" state ${}_{en}{}^F\Psi_3$ by switching on the magnetic field while observing boundary condition (R3), said state must be assigned the following entropy:

$$S_{GS}({}_{en}{}^F\Psi_3)=1. \tag{33}$$

However, under these boundary conditions, the quantum system must be considered to be a closed system. However, according to the second law of thermodynamics, the operator $U_{NLF}$ assigned to this preparation step then describes an irreversible process. In contrast thereto, a switching-on process of the magnetic field must, as a matter of principle, be considered to be reversible if the magnetic field is switched on sufficiently slowly (if boundary condition (R3) is not satisfied), i.e. if the switching-on process can be controlled. Moreover, the quantum system must be considered to be an open system (not a closed system) in this case (of course, this also applies if the magnetic field is switched off). From a physical point of view, the quantum system can, in the spin degree of freedom, exchange energy with the time-varying magnetic field during this preparation step. Clearly, there therefore must be a fundamental difference between these preparation processes since one process is irreversible and the other process is reversible. If the assumption is made that the hypothesis of the method, proposed in Section VII in [1], for interaction-free entanglement of quantum systems is correct, the preparation process which is realized by switching on the magnetic field 13, while observing the boundary condition (R3) must be based on a novel physical process which was previously not observed. However, whether said process corresponds to the coherently coupled vacuum fluctuations described in section V in [1] cannot be decided here. It appears as if this question will only be decided once the method, as described in Section VI in [1], for interaction-free information transmission can be realized successfully since the latter can only be realized precisely when the process of coherently coupled vacuum fluctuations may in fact occur physically. This method should still briefly be discussed below.

The method, as described in Section VI in [1], for interaction-free information transmission was initially proposed in [13]. In this method, four identical spin Y2 systems $S_i$, $S_2$, $S_3$ and $S_4$ are considered. The fact that this can be used as a test for the process, postulated in [13], for coherently coupled vacuum fluctuations is down to the boundary conditions required for this method. Said boundary conditions need to be selected in such a way that there are two possibilities which, as a matter of principle, are indistinguishable (within the meaning of the superposition principle) during the considered preparation step: in the first possibility, the process of coherently coupled vacuum fluctuation may occur between the quantum systems $S_i$ and $S_4$. In the second possibility, this is not the case (in this respect, see also the deliberations in conjunction with FIG. 9 in Section VI in [13]). FIG. 9 schematically describes the two possibilities which are indistinguishable as a matter of principle. A formally correct mathematical description of the considered preparation step was then worked out in [13] on the basis of these deliberations (in this respect, see Equation (42) to Equation (50) in [13]). Under what boundary conditions on the quantum systems $S_i$ and $S_4$ the process of coherently coupled vacuum fluctuations may occur was also correctly identified intuitively (but this was not justified in [13]). What was not identified is that the considered preparation step can only be realized precisely when very specific boundary conditions are also satisfied for the quantum systems $S_2$ and $S_3$ (see below). As a result of this error, the design, proposed in [13], for realizing the method cannot be realized successfully. The method, proposed in [13], for interaction-free information transmission can only be realized successfully once the required boundary conditions are also selected correctly for the quantum systems $S_2$ and $S_3$.

The method, as proposed in [13], for interaction-free information transmission was then once again taken up in Section VI in [1]. What was clearly identified here is that [13] was unsuccessful in working out a criterion which describes when the boundary conditions that are required for successful realization of this method are satisfied. However, since [1] was also unsuccessful in working out this criterion, incorrect conclusions were drawn therein. This led to the "variant 2", as described in Section VI in [1], for the realization of the method, as proposed in [13], for the interaction-free information transmission. However, the latter cannot be realized as a matter of principle (see below). This error is remarkable inasmuch as, strictly speaking, all information for working out the sought-after criterion was already available in [1]. The reason for this can presumably only be seen in the fact that [1] was also still unable to identify that the generally accepted idea that each physically realizable, unitary operator which describes a state transformation describes a reversible process cannot be correct (see above). Therefore, [1] did not identify either that the unitary operator $U_{KV}$ (in this respect, see Equation (46) in [13]) describes an irreversible process and that the required boundary conditions for realizing the method, as proposed in [13], for the interaction-free information transmission can be set by the entropy of the quantum system (see below).

The following should provide a brief explanation as to how the method, as proposed in [13], for interaction-free information transmission can be realized correctly. Static magnetic fields, into which the quantum systems $S_i$ and $S_4$ can enter with defined speeds and at precisely defined times, were considered in [13]. Since this is very difficult to realize from a technical point of view, the following considers identical spin ½ systems $S_i$ (i=1, 2, 3, 4) which are at rest. Here, the individual quantum systems are to be localized in clearly distinguishable spatial regions $R_i$ ($S_i$ in wherein the spatial regions should not overlap). Here, the distances between the spatial regions $R_i$ should be so great that an interaction between the quantum systems $S_i$ can be excluded. It should be possible to superpose a magnetic field ${}_iB_z$ onto each spatial region $R_i$. The magnetic fields should be able to be switched on and off, as desired. The following shall apply to the switched-on magnetic fields: ${}_1B_2={}_2B_2={}_3B_2={}_4B_2$. Both variants can be considered to be equivalent to one another.

At the start, all four magnetic fields should be switched on. Furthermore, the quantum systems S and $S_2$ should be present in the maximally entangled Bell state $\Psi\_$. The same should apply to the quantum systems $S_3$ and $S_4$. The state $\Psi\_^{43/21}$ in accordance with the following can then be assigned to the quantum system composed of the systems $S_1$ to $S_4$:

$$\Psi\_^{43/32}=\Psi\_^{43}\times\Psi\_^{21} \tag{34}$$

where: $\Psi\_^{43}=½2^{1/2}(|1>_4|0>_3-|0>_4|1>_3)$
$\Psi\_^{21}½^{1/2}(|1>_2|0>_1-|0>_2|1>_1)$.

The quantum system is then present as an energetically represented system. The following value then emerges for the entropy $S_{GS}$:

$$S_{GS}({}_{en}\Psi\_^{43/21})=2. \tag{35}$$

The magnetic Fields ${}_1B_z$ and ${}_4B_z$ should then be switched off simultaneously in a controlled manner (the boundary condition (R3) should not be satisfied here) at a fixed time $T_A$ (with ${}_1B_z(t)=4B_z(t)$, t in this case denotes time). By means of the time profile of the switching-off process, it is possible to set at which time $T_E>T_A$ the state ${}_{en23el14}\Psi\_^{43/21}$ can then be assigned to the quantum system. Here, the index "en23el14" means that the quantum systems $S_2$ and $S_3$ have an energetic representation and the quantum systems $S_1$ and $S_4$ do not have an energetic representation. This can easily be shown: if the quantum system consisting of the systems $S_1$ and $S_2$ is in the energetically represented state ${}_{en}\Psi_^{21}$en at the time $T_A$ and if the magnetic field ${}_1B_z$ superposed onto the spatial region $R_1$ is then switched off at the time $T_A$ in a controlled manner, the state of the system then develops according to $$\Psi_{36}=½^{1/2}(|1>_2 2|0>_1-e^{i\,\phi(t)}|0>_2|1>_1) \tag{36}$$

Here, during the switching-off process, the phase $\phi(t)$ depends on the time profile of the magnetic field ${}_1B_z$ (t) and on the magnetic field ${}_2B_z$. Thereafter, $\phi(t)$ only depends on ${}_2B_z$. If the time $T_E$ is then selected in such a way that the phase $\phi(t)$ at this time has just changed by an integer multiple of $2\pi$ (this is always possible), the state ${}_{en2el1}\Psi\_^{21}$ emerges at the time $T_E$. The same deliberations also apply to the system consisting of the systems $S_3$ and $S_4$. The following value then emerges for the entropy $S_{GS}$:

$$SG({}_{en23el14}\Psi\_^{43/21})=2, \tag{37}$$

since the systems $S_1$ and $S_4$ are already completely energetically characterized and therefore the not available knowledge about the quantum system is set by the systems $S_2$ and $S_3$.

If the magnetic fields ${}_1B_z$ and ${}_4B_z$ are now switched on simultaneously at the time $T_E$ while observing the boundary condition (R3), the process of coherently coupled vacuum fluctuations, as postulated in Section V in [13], should be able to occur since the state $\Psi\_^{43/21}$ has the properties required therein. These are the following: 1.): In the spin degree of freedom, both the energy $\mu B_z$ and the energy $-\mu B_z$ must be able to be assigned to the systems $S_1$ and $S_4$ by means of the energetic representations possible for the quantum system. 2.): In order to be able to describe the state component assigned to the systems $S_1$ and $S_4$ with respect to the Bell basis, the basis vector $\Psi_-$ must be required. The first condition is clearly satisfied. The fact that the second condition is also satisfied can be seen if the state $\Psi_-^{43/21}$ is rewritten:

$$\Psi_-^{43/21}=\tfrac{1}{4}^{1/4}\{\Psi_+^{41/32}-\Phi_+^{41/32}-\Psi_-^{41/32}+\Phi_-^{41/32}\}$$

where: $\Psi_+^{41/32}=\tfrac{1}{2}^{1/2}\{|1>_4\,\Psi_+^{32}|0>_1+|0>_4\,\Psi_+^{=}|1>_1\}$ $$\Phi_+^{41/32}=\tfrac{1}{2}^{1/2}\{|0>_4\,\Phi_+^{32}|0>_1+|1>_4\,\Phi_+^{=}|1>_1\}$$

$$\Phi_-^{41/32}=\tfrac{1}{2}^{1/2}\{|0>_4\,\Phi_-^{32}|0>_1-|1>_4\,\Phi_-^{=}|1>_1\}$$

$$\Psi_+^{41/32}=\tfrac{1}{2}^{1/2}\{|1>_4\,\Psi_-^{32}|0>_1-|0>_4\,\Psi_-^{=}|1>_1\}$$

and: $\Psi_+^{32}=\tfrac{1}{2}^{1/2}(|1>_3|0>_2+|0>_3|1>_2)$ $$\Phi_+^{32}=\tfrac{1}{2}^{1/2}(|0>_3|0>_2+|1>_3|1>_2)$$

$$\Psi_-^{32}=\tfrac{1}{2}^{1/2}(|1>_3|0>_2-|0>_3|1>_2)$$

$$\Phi_-^{32}=\tfrac{1}{2}^{1/2}(|0>_3|0>_2-|1>_3|1>_2)$$

Provided that the process of coherently coupled vacuum fluctuations is the only process which can occur under these conditions, it should then occur with certainty if the boundary conditions prescribed by the systems $S_2$ and $S_3$ permit this (see below).

As shown in Section VI in [13], this preparation step (the simultaneous switching-on of the magnetic fields ${}_1B_z$ and ${}_4B_z$ while observing the boundary condition (R3)) can be described by the unitary operator $U_{KV}$ in accordance with $$\Psi_{39}=U_{KV}(\Psi_-^{43/21})=\tfrac{1}{2}^{1/2}(\Psi_-^{43/21}-\Phi_-^{43/21}), \tag{39}$$

where: $\Phi_-^{43/21}=\Phi_-^{43}\times\Phi_-^{21}$ and: $\Phi_-^{43}=\tfrac{1}{2}^{1/2}(|0>_4|0>_3-|1>_4|1\geq_3)$ $$\Phi_-^{21}=\tfrac{1}{2}^{1/2}(|0>_2|0>_1-|1>_2|1\geq_1)$$

and:

$$U_{KV}=\frac{1}{\sqrt{2}}\begin{matrix} & \langle A| & \langle B| \\ |A\rangle & 1 & -1 \\ |B\rangle & 1 & 1 \end{matrix} \tag{40}$$

where: $|A>=\tfrac{1}{2}^{1/2}(\Psi_+^{41/32}-\Phi_+^{41/32})$ and $|B>=\tfrac{1}{2}^{1/2}(\Psi_-^{41/32}-\Phi_-^{41/32})$.

On the computational basis, the following is then obtained for $\Psi_{39}$:

$$\Psi_{39}=1/8^{1/2}\{|1\rangle_4|0\rangle_3|1\rangle_2|0\rangle_1-|1\rangle_4|0\rangle_3|0\rangle_2|1\rangle_1-|0\rangle_4|1\rangle_3|1\rangle_2|0\rangle_1+|0\rangle_4|1\rangle_3|0\rangle_2|1\rangle_1-|0\rangle_4|0\rangle_3|0\rangle_2|0\rangle_1+|0\rangle_4|0\rangle_3|1\rangle_2|1\rangle_1+|1\rangle_4|1\rangle_3|0\rangle_2|0\rangle_1-|1\rangle_4|1\rangle_3|1\rangle_2|1\rangle_1\}. \tag{41}$$

The following value then emerges for the entropy $S_{GS}$ for the energetically represented quantum system in the state $\Psi_{39}$:

$$S_{GS}({}_{en}\Psi_{39})=3. \tag{42}$$

Since the quantum system must be considered to be a closed system in this preparation step and since the entropy of the quantum system increases during this preparation step, the unitary operator $U_{KV}$ must, in accordance with the second law of thermodynamics, describe an irreversible process.

However, as result of this, it is also then clear that the "variant 2", as proposed in Section VI in [1], cannot be realized as a matter of principle. This is because the starting point there is the state ${}_{en14el23}\Psi_-^{43/21}$. In said state, the systems $S_1$ and $S_4$ have an energetic representation and the systems $S_2$ and $S_3$ do not. Then, the following value emerges for the entropy $S_{GS}$:

$$S_{GS}({}_{en14el23}\Psi_-^{43/21})=2. \tag{43}$$

If the magnetic fields ${}_1B_z$ and ${}_4B_z$ are switched off while observing the boundary condition (R3), the quantum system is thereafter present as an elementary quantum system. According to Equation (29) for $S_{GS}$, the value $S_{GS}$ (elementary quantum system)=0 emerges, independently of the state in which the quantum system is present. Therefore, the entropy must have decreased during this preparation step. However, since the quantum system must be considered to be a closed system under these conditions, it is, according to the second law of thermodynamics, fundamentally impossible for the entropy to decrease. Therefore, it is clear that the variant 2 cannot be realized as a matter of principle.

The fact that the method, as proposed in [13], for interaction-free information transmission (variant 1 in Section VI in [1]) cannot be realized successfully lies in the fact that the Systems $S_2$ and $S_3$ in [13] do not have an energetic representation in the initial state ${}_{ei}$tlf$_-^{43/21}$ either. This is also the fundamental difference to the situation considered here.

This can easily be appreciated. If (as described above) one proceeds from the state ${}_{en23el14}\Psi_-^{43/21}$ the following circumstance emerges: at the time $T_B$, the systems $S_1$ and $S_2$ are present in the maximally entangled state ${}_{en2el1}\Psi_-^{21}$. As result of this fact and since the system $S_2$ has already realized an energetic representation, the energetic representation emerging at the system $S_1$ when the magnetic field ${}_1B$, is switched on sufficiently slowly (the boundary condition (R3) is not satisfied) and in a controlled manner has already been established (even if it is, as a matter of principle, impossible to predict which energetic representation was in fact realized). The same deliberation also applies to the systems $S_3$ and $S_4$. Then, two in principle indistinguishable possibilities (cases) emerge within the meaning of the superposition principle when simultaneously carrying out the switching-on process, as described by the operator $U_{KV}$, of the magnetic fields ${}_1B_z$ and ${}_4B$, while observing the boundary condition (R3):

(Case I): The energetic representations ("the alignments of the spins") of the systems $S_2$ and $S_3$ are the same. As a result, the process of the coherently coupled vacuum fluctuation cannot occur since it is necessary, to this end, for the spins of systems $S_1$ and $S_4$ "to be able to align antiparallel", which, however, is impossible in this case as a matter of principle.

(Case II): The energetic representations (the alignments of the spins) of systems $S_2$ and $S_3$ are unequal ("the spins are aligned antiparallel to one another"). In this case, the process of the coherently coupled vacuum fluctuation may occur. This then leads to a "simultaneous folding-over" of the spins.

These deliberations are explained in more detail in Section VI in [13] in conjunction with FIG. 9. The operator $U_{Ky}$ describes this preparation step correctly only if there are these two indistinguishable possibilities within the meaning of the superposition principle during the simultaneous switching-on process of the magnetic fields ${}_1B_z$ and ${}_4B_z$. However, if this method can be realized successfully, this conversely means that the postulated process of coherently coupled vacuum fluctuations may in fact occur physically.

The operating state of the design denoted in Section VI in [13] as "synchronous" or as "asynchronous" operation of the sources $Q_{2/1}$ and $Q_{3/4}$ then in this case corresponds to the simultaneous (synchronous) switching-on of the magnetic fields ${}_1B_z$ and ${}_4B_z$ while observing the boundary condition (R3) or the time-offset (asynchronous) switching-on of the magnetic fields ${}_1B_z$ and ${}_4B_z$ while observing the boundary condition (R3). Here, the switching-on processes must not overlap in time for the asynchronous operation. Alternatively, the asynchronous operation could also be realized here by virtue of in each case only one magnetic field (either ${}_1B_z$ or ${}_4B_z$) being switched on while observing the boundary condition (R3).

In the method, as proposed in [1], for interaction-free entanglement of quantum systems in quantum computers, a homogeneous magnetic field $B_z$ must be superposed onto the quantum systems to be entangled while observing the boundary condition (R3) in order to be able to realize the preparation step required for the entanglement. In [1], what is proposed is to superpose the magnetic field $B_z$ on the quantum systems by virtue of the former being switched on. Preferably, this can be brought about by means of low-inductive coils in the Helmholtz arrangement.

As shown in [1] in the context of Equations (62) and (63), this allows e.g. product states of the form $$\Psi_{44}=e^{i\theta}/2^{1/2}(½^{1/2}(|0,0>-e^{i2\phi}|1,1<)+e^{i\phi}\Psi\_), \quad (44)$$

with any real phases $\phi$ and $\theta$, to be transferred into the entangled state $\Psi\_$. Since the process of the coherently coupled vacuum fluctuations which underlies this method may however also occur in other states if the boundary conditions required for the process of coherently coupled vacuum fluctuations are satisfied (in this respect, see [1]), the method as proposed in [1] can naturally also be applied to states which meet these boundary conditions. To this end, no product state is necessary. An example is formed by states of the form $$\Psi_{45}=½^{1/2}(½^{1/2}(|0,0>-^{i\theta}81,1>)+e^{i\phi}\Psi\_), \quad (45)$$

with any real phases $\phi$ and $\theta$. If a magnetic field $B_z$ is superposed on the two qubits in the state $\Psi_{45}$ while observing the boundary condition (R3), these are likewise transferred into the state $\Psi\_$.

In order to be able to realize a powerful quantum computer, several thousand or even ten thousand quantum bits are required. However, this means that it is necessary to be able to switch on just as many magnetic fields independently of one another, while observing the boundary condition (R3), and thereafter switch these off again in a controlled manner. In order to be able to realize this reliably, the required coils and the current sources required for operation must be able to be manufactured very precisely and actuated and operated with high precision. This is connected with high costs and much manufacturing outlay.

In order to be able to avoid these disadvantages, what is proposed according to the invention is that the individual quantum bits are localised in spatial regions in such a way that these can be provided with switchable sheaths. These switchable sheaths should be embodied in such a way that they can assume two operating states. In the first operating state—the "activated state"—the switchable sheath should completely displace a global, static, homogeneous magnetic field $B_z$ from the spatial region surrounded by said sheath. The corresponding spatial region is then without a field. In the second operating state—the "inactivated state"—the switchable sheath should not displace the magnetic field $B_z$ from the spatial region surrounded by said sheath. In this case, the magnetic field $B_z$ penetrates the corresponding spatial region unhindered.

If the switchable sheaths are transferred (switched) sufficiently quickly from the activated state into the inactivated state, it is possible thereby to superpose the magnetic field $B_z$ on the corresponding quantum bits under observation of the boundary condition (R3). All that is required for this is that the switchable sheaths can be transferred (switched) from the activated state into the inactivated state within a time $\Delta t<t_{max}=h/(4\pi\Delta E_z/2)$.

One embodiment of the invention provides for the switchable sheaths to consist of a superconductor with the jump temperature $T_{SU}$. The activated state can then be realized by virtue of the superconductor being operated at a temperature of less than $T_{SU}$ such that the superconductor, as a result of this, is completely in the superconducting state. The inactivated state can then be realized by virtue of operating the superconductor at a temperature greater than $T_{SU}$ such that the superconductor as a result of this is—preferably—completely in the normally conducting state.

Figure 4:
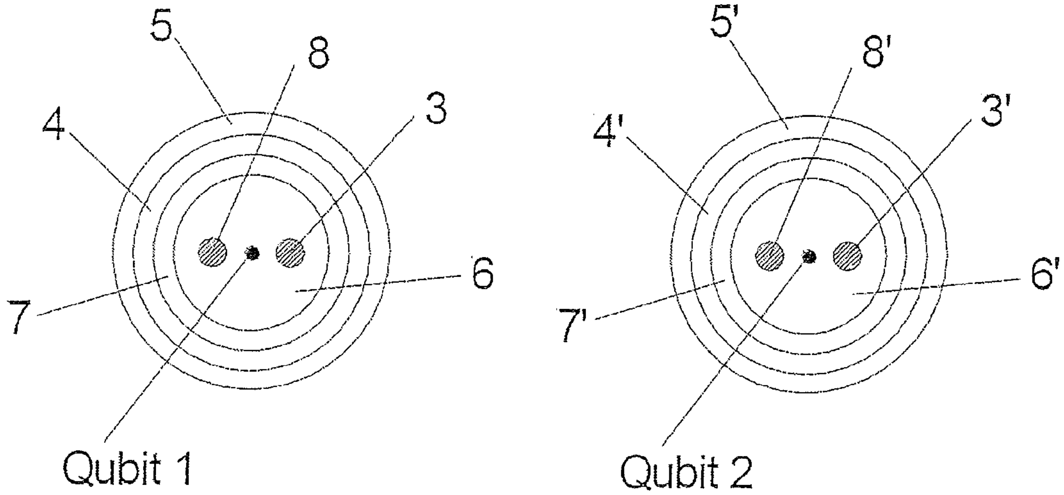
FIG. 4 shows the case for two quantum bits in an exemplary manner.

Further embodiments of the invention are explained on the basis of FIG. 4. FIG. 4 shows the case for two quantum bits in an exemplary manner. These are denoted as qubit 1 and qubit 2. Qubit 1 (2) is to be embedded in a solid-state body 6 (6'), preferably in the centre thereof. The solid-state body 6 (6') is preferably to be embodied as an optical waveguide in order to be able to read out and/or write the qubit 1 (2). The light necessary for this is to be able to be coupled or decoupled at the ends of the solid-state body by means of suitably designed optical units. By way of example, the solid-state body 6 (6') can be realized as a thin fibre with a diameter of approximately 2 μm and a length of approximately 100 μm. The longitudinal axes of the fibres are to be preferably aligned perpendicular to the global magnetic field $B_z$. If the qubits are realized by $^{13}C$-atoms, the solid-state bodies can preferably be realized by a diamond. If the qubits are realized by $^{40}Ca^+$-ions, the solid-state bodies can preferably be realized by calcium fluoride.

In order to be able to shield the region of the solid-state body 6 (6') from the global, static, homogeneous magnetic field $B_z$, in which qubit 1 (2) is localized, the switchable sheath 7 (7') should be applied to the surface of the solid-state body 6 (6'). By way of example, this can be brought about by a vapour deposition process. The switchable sheath should consist of a superconductor with the jump temperature $T_{SU}$. An insulation layer 4 (4') should be applied onto the switchable sheath 7 (7'). A resistance layer should be integrated into the insulation layer 4 (4'). An electric voltage should be able to be applied thereon. If this voltage is only applied briefly with a precisely defined voltage profile, this leads to a quick and precisely defined heating of the insulation layer, and therefore also to a defined heating of the layers thermally connected to the insulation layer. Preferably, the current should be guided spatially in the resistance layer in such a way that the magnetic field generated by the current disappears at the location of the qubit even if the switchable sheath is in the inactivated state.

A control layer 5 (5') is to be applied onto the insulation layer 4 (4'). The control layer is to consist of a superconductor with the jump temperature $T_{SS}$. The control layer 5 (5') is to be thermally connected to a heat sink with a temperature $T_{WS}$. Furthermore, the following should apply: $T_{WS}<T_{SS}<T_{SU}$. It should be possible to apply a constant voltage to the control layer 5 (5'). Said voltage should be selected in such a way that the temperature of the control layer 5 (5') is stabilised precisely at the jump temperature $T_{SS}$ if the temperature $T_{WS}$ of the heat sink is selected in a suitable manner (in this respect, see also [16]). As a result of this, it is possible to ensure that, in thermal equilibrium, the temperature of the solid-state body, of the switchable sheaths, of the insulation layers and of the control layers automatically adjusts to the temperature $T_{SS}$. Here, the jump temperature $T_{SS}$ should be tuned to the jump temperature $T_{SU}$ by a suitable selection of the superconductors such that the switchable sheath 7 (7') is just completely in the superconducting state at the temperature $T_{SS}$. Preferably, the current should be guided spatially in the control layer in such a way that the magnetic field generated by this current disappears at the location of the qubit even if the switchable sheath is in the inactivated state.

A further advantageous embodiment of the invention provides for the thermal capacity of the switchable sheath 7 (7'), of the insulation layer 4 (4') and of the control layer 5 (5') to be tuned in such a way to a short voltage pulse applied to the resistance layer that, as result thereof, the switchable sheath can be transferred from the completely superconducting state into the completely normally conducting state within a time $\Delta t<t_{max}=h/(4\pi\Delta E_z/2)$.

In principle, all superconductors in which the transition between the completely superconducting state and the completely normally conducting state occurs in a sufficiently small temperature interval are suitable for the switchable sheaths and the control layers. The smaller this interval is, the less energy is required to achieve this transition. Examples for appropriate superconductors are found in [16].

For applications in which the cubits are realized by the nuclear spin (such as e.g. in $^{13}C$), it is advantageous to arrange the electrodes 3 (3') and 8 (8') in the solid-state body 6 (6') in such a way that a suitably selected radiofrequency AC voltage can be applied between these and, as a result of this, the qubits can be prepared in the desired state by a suitably selected pulse of the radiofrequency AC voltage.

CITATIONS

[1]: German patent application DE 10 2012 000 044.8; Verfahren zur wechselwirkungsfreien Verschränkung von Quantensystemen in Quantencomputern ["Method for interaction-free entanglement of quantum systems in quantum computers"]; Gerhart Schroff, 7 Jul. 2011.

[2]: R. P. Feynman, R. B. Leighton and M. L. Sands in"The Feynman Lectures on Physics" (Addison-Wesley Publishing Co., Inc. Reading, 1989).

[3]: D. M. Greenberger, M. A. Horne, A. Zeilinger, Phys. Today, 22, (August 1993).

[4]: Jürgen Audretsch; Verschränkte Systeme. Die Quantenphysik auf neuen Wegen [Entangled systems. Quantum physics on new paths]; WILEY-VCH, ISBN 3-527-40452-X.

[5]: A. Zeilinger, Am. J. Phys. 49, 882, (1981).

[6]: Wolfgang Hänsel; Quantenbits in der lonenfalle; Der Quantenmechanik in die Karten geschaut [Quantum bits in the ion trap; looking into the cards of quantum physics]; Physik in unserer Zeit, February 2006 (37), 64.

[7]: W. Pauli, The Connection between Spin and Statistics; Phys. Rev. Vol. 58, 716-732 (1940). An alternative derivation of the relationship between spin and statistics are found in: Arthur Jabs; Connecting Spin and statistics in quantum mechanics; Foundations of Physics 40 (7), 776-792, 793-794 (2010).

[8]: Max Wutz; Theorie and Praxis der Vakuumtechnik [Theory and practice of vacuum technology]; (1965), Friedr. Vieweg & Sohn, Braunschweig.

[9]: Claus Kiefer; Auf dem Weg zur Quantengravitation [on the path to quantum gravitation]; Spektrum der Wissenschaft, April 2012, pages 34-43. Joseph Polchinski; Volume I, An Introduction to the Bosonic String, String Theorie; 2005 Cambridge University Press, ISBN 978-0-521-67227-6.

[10]: Jan Ambjorn, Jerzy Jurkiewicz and Renate Loll; Das fraktale Quantenuniversum [the fractal quantum universe]; Spektrum der Wissenschaft, February 2009, pages 24-31. Loll R. The Emergenze of Space-time, or Quantum Gravity on Your Desktop. In: Classical and Quantum Gravity 25 (11), Nr. 114006, 2008.

[11]: Dissertation; Mark Riebe; Preparation of Entangled States and Quantum Teleportation with Atomic Qubits; Institut für Experimentalphysik, Leopold-Franzens-Universität Innsbruck (2005).

[12]: Haye Hinrichsen; Informationstheoretischer Zugang zur Entropie; Entropie entmystifiziert [An information theoretical approach to entropy; entropy demystified]; Physik in unserer Zeit, May 2012 (43), 246.

[13]: German patent application DE 10 2010 047 168.2; Verfahren zur wechselwirkungsfreien Informationsübertragung [Method for an interaction-free information transmission]; Gerhart Schroff, 30 Sep. 2010.

[14]: Haken, Wolf; Molekülphysik and Quantenchemie [molecular physics and quantum chemistry]; third edition, chapter 18; Springer Verlag, ISBN 3-540-63786-9 (1998).

[15]: S. Olmschenk, D. N. Matsukevich, P. Maunz, D. Hayes, L.-M. Duan, C. Monroe; Quantum Teleportation Between Distant Matter Qubits; Science, Vol. 323, 486-489, 23 January 2009.

[16]: Ch. Enss; Cryogenic Particle Detection: Springer, ISBN-13 978-3-540-20113-7.

[17]: Rodney Loudon; The Quantum Theory of Light; Third Edition; ISBN 978-0-19-850176-3.

[18]: H. de Riedmatten, et al; Quantum interference with photon pairs created in spatially separated sources; Physical Review A 67, 022301 (2003).

The invention claimed is:

1. A method for interaction-free entanglement of two quantum bits in quantum computers, in which the quantum bits to be entangled are available in a state ($\Psi_{44}$) with arbitrarily real phases $\phi$ and $\theta$ as an elementary quantum system, comprising:

localizing the two quantum bits (1, 2) to be entangled in a first spatial region (6) and in a second spatial region (6')

surrounding the first and second spatial regions (6, 6') by respectively one electrically switchable sheath (7, 7'), wherein the switchable sheaths, in the activated state, completely displace a global, homogeneous magnetic field $B_z$ from the first and second spatial regions (6, 6'), wherein, in the inactivated state, the magnetic field $B_z$ penetrates through the switchable sheaths and therefore also through the first and second spatial regions (6, 6'), and switching the switchable sheaths from the activated state into the inactivated state having an energy difference $\Delta E_z$ while observing a boundary condition $$\Delta t_S<t_{max}=h/(4\pi\Delta E_z/2)$$

where $\Delta t_S$ denotes the time required for switching on the magnetic field, h denotes the Planck constant and $t_{max}$ denotes the maximum possible time predetermined by the energy/time uncertainty principle and, as a result of this, transferring the two quantum bits (1, 2) into the entangled state ($\Psi_-$).

2. The method according to claim 1, wherein the switchable sheaths (7, 7') comprise a superconductor with a jump temperature $T_{SU}$ and the switchable sheaths (7, 7') are completely superconductive in the activated state and completely normally conductive in the inactivated state.

3. The method according to claim 2, wherein the switchable sheaths (7, 7') are each surrounded by an insulation layer (4, 4') and the insulation layers contain a resistance layer, wherein switching involves heating of the insulation layers and therefore also the switchable sheaths by the application of a short voltage pulse to the resistance layers such that the temperature of the switchable sheaths increases discontinuously over the jump temperature $T_{SU}$ while observing said boundary condition and wherein the switchable sheaths are, as a result of this, transferred from the activated state into the inactivated state.

4. The method according to claim 3, wherein the insulation layers (4, 4') are surrounded by respectively one control layer (5, 5') and the control layers consist of a superconductor with a jump temperature $T_{SS}<T_{SU}$ and are thermally connected to a heat sink with a temperature less than $T_{SS}$, wherein a constant voltage is applied to the control layers and the voltage is selected in such a way that the temperature of the control layers stabilizes at the jump temperature $T_{SS}$ and, as result of this, the switchable sheaths are completely in the activated state.

5. The method according to claim 1, wherein the utilized quantum bits are $^{13}C$-atoms in a diamond.

6. The method according to claim 1, wherein the utilized quantum bits are $^{40}Ca^+$-ions in the electronic ground state ($4^2S_{1/2}$).

7. The method according to claim 2, wherein the utilized quantum bits are $^{13}C$-atoms in a diamond.

8. The method according to claim 3, wherein the utilized quantum bits are $^{13}C$-atoms in a diamond.

9. The method according to claim 4, wherein the utilized quantum bits are $^{13}C$-atoms in a diamond.

10. The method according to claim 2, wherein the utilized quantum bits are $^{40}Ca^+$-ions in the electronic ground state ($4^2S_{1/2}$).

11. The method according to claim 3, wherein the utilized quantum bits are $^{40}Ca^+$-ions in the electronic ground state ($4^2S_{1/2}$).

12. The method according to claim 4, wherein the utilized quantum bits are $^{40}Ca^+$-ions in the electronic ground state ($4^2S_{1/2}$).

* * * * *